(12) United States Patent
Tetreault et al.

(10) Patent No.: US 11,905,961 B2
(45) Date of Patent: Feb. 20, 2024

(54) ADAPTIVE CAPACITOR SECTION FOR FAN SPEED CONTROL

(71) Applicant: Hubbell Incorporated, Shelton, CT (US)

(72) Inventors: Michael Dennis Tetreault, Simsbury, CT (US); Nick Charles Kraus, Enfield, CT (US)

(73) Assignee: Hubbell Incorporated, Shelton, CT (US)

( * ) Notice: Subject to any disclaimer, the term of this patent is extended or adjusted under 35 U.S.C. 154(b) by 226 days.

(21) Appl. No.: 17/162,615

(22) Filed: Jan. 29, 2021

(65) Prior Publication Data

US 2021/0239125 A1 Aug. 5, 2021

Related U.S. Application Data

(60) Provisional application No. 62/968,382, filed on Jan. 31, 2020.

(51) Int. Cl.
*F04D 27/00* (2006.01)
*F04D 25/08* (2006.01)
*G05B 15/02* (2006.01)

(52) U.S. Cl.
CPC .......... *F04D 27/004* (2013.01); *F04D 25/088* (2013.01); *G05B 15/02* (2013.01)

(58) Field of Classification Search
CPC ..... F04D 27/004; F04D 25/088; G05B 15/02; Y02B 30/70

USPC ........................................................ 700/282
See application file for complete search history.

(56) References Cited

U.S. PATENT DOCUMENTS

| 4,555,654 | A | 11/1985 | Spradling et al. |
| 5,449,275 | A | 9/1995 | Gluszek et al. |
| 6,120,262 | A | 9/2000 | McDonough et al. |
| 2019/0186496 | A1* | 6/2019 | Monteith ............. F24F 11/0001 |
| 2019/0219059 | A1 | 7/2019 | Stefankiewicz et al. |

OTHER PUBLICATIONS

PCT/US2021/015775 International Search Report and Written Opinion dated Apr. 14, 2021 (16 pages).

* cited by examiner

*Primary Examiner* — Mohammad Ali
*Assistant Examiner* — Saad M Kabir
(74) *Attorney, Agent, or Firm* — Robinson + Cole LLP

(57) ABSTRACT

A fan controller for a ceiling fan is provided. The fan controller includes one or more switching devices configured to selectively couple the ceiling fan to a power source. The fan controller includes a first capacitor having a first capacitance and a second capacitor having a second capacitance that is larger than the first capacitance. The fan controller includes a power meter circuit and one or more control devices. The one or more control devices are configured to obtain, via the power meter circuit, data indicative of electrical power a fan motor of the ceiling fan draws from the power source. The one or more control devices are configured determine a size of the fan motor based on the data. The one or more control devices are configured to select the first capacitor or the second capacitor as a selected capacitor based on the determined size of the fan motor.

20 Claims, 13 Drawing Sheets

ADAPTIVE CAPACITOR SECTION FOR FAN SPEED CONTROL

CROSS-REFERENCE TO RELATED APPLICATIONS

This application claims the benefit of prior-filed U.S. Provisional patent Application No. 62/968,382, filed Jan. 31, 2020, the entire contents of each are incorporated by reference.

FIELD

The present disclosure relates generally to ceiling fans and, more particularly, fan controllers for ceiling fans.

BACKGROUND

Ceiling fans can include a plurality of fan blades and a fan motor. The fan motor can be configured to drive rotation of the fan blades to circulate air within a space. Fan controllers can be used to control operation of the fan motor. For instance, the fan motor can be selectively coupled to a power source via one of or more the capacitors of the fan controller to control a speed at which the fan motor rotates. In this manner, the fan motor can operate at a plurality of different speed settings (e.g., low, medium, high).

SUMMARY

Aspects and advantages of embodiments of the present disclosure will be set forth in part in the following description, or may be learned from the description, or may be learned through practice of the embodiments.

In one aspect, a fan controller for a ceiling fan is provided. The fan controller includes one or more switching devices configured to selectively couple the ceiling fan to a power source. The fan controller includes a first capacitor having a first capacitance and a second capacitor having a second capacitance that is larger than the first capacitance. The fan controller includes a power meter circuit and one or more control devices. The one or more control devices are configured to obtain, via the power meter circuit, data indicative of electrical power a fan motor of the ceiling fan draws from the power source. The one or more control devices are configured determine a size of the fan motor based on the data. The one or more control devices are configured to select the first capacitor or the second capacitor as a selected capacitor based on the determined size of the fan motor. Furthermore, in response to the one or more control devices obtaining data indicative of a user-request to operate the fan motor at a lowest speed setting of a plurality of speed settings for the fan motor, the one or more control devices are configured to couple the fan motor to the power source via the selected capacitor.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
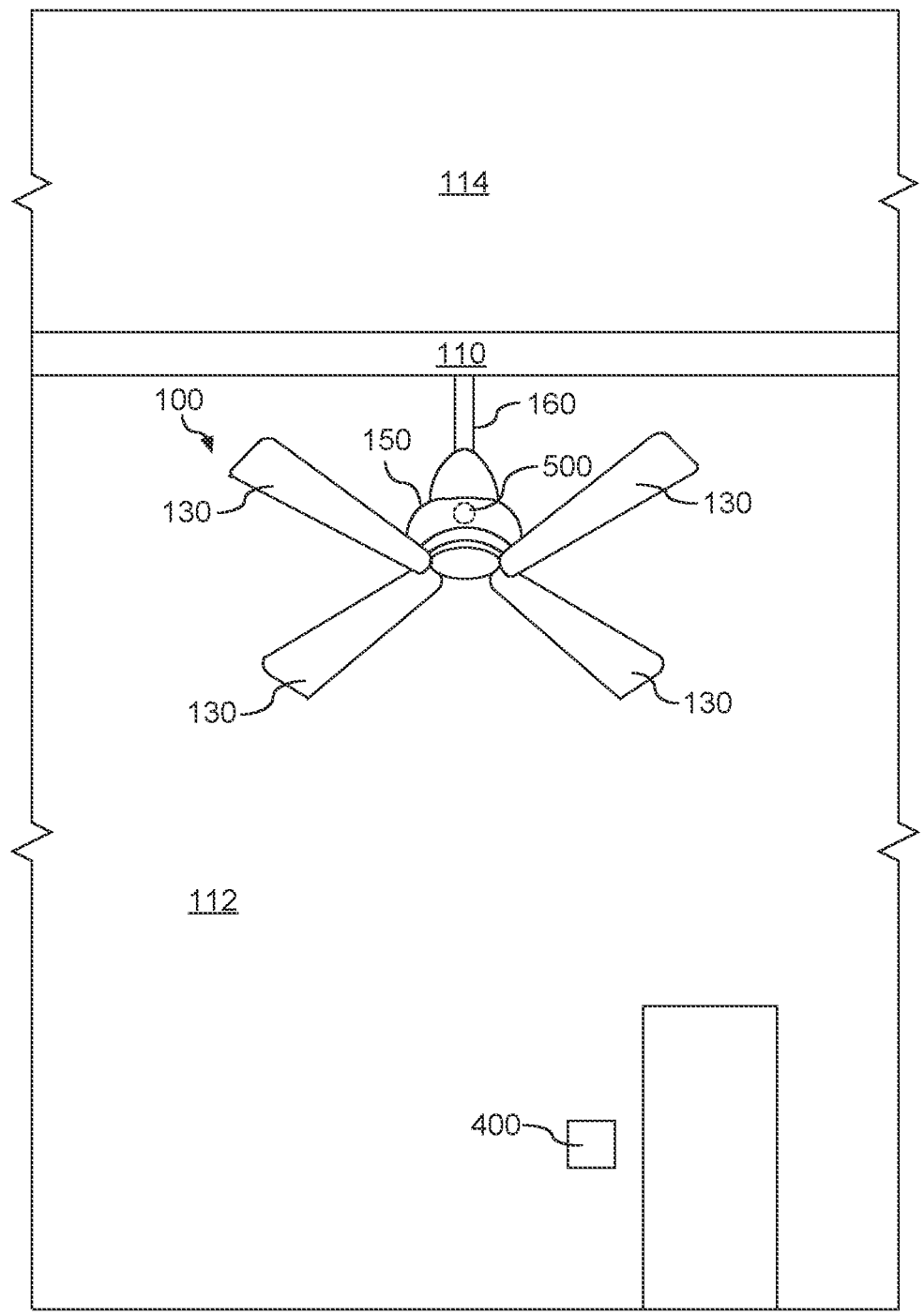
FIG. 1 depicts a ceiling fan according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Typical fan controllers for ceiling fans capacitors that can be selectively coupled to a fan motor of the ceiling fan to facilitate speed control of the fan motor. For instance, typical fan controllers couple a single capacitor to the fan motor to operate at a lowest speed setting of a plurality of speed settings for the fan motor. Furthermore, typical fan controllers select the capacitor having a small capacitance to operate the fan motor at the lowest speed setting. This approach (e.g., coupling the fan motor to the capacitor having the small capacitance) is desirable for a small fan motor. However, this same approach is less desirable for a larger fan motor (e.g., 90 Watt motor), because doing so will cause the larger fan motor to rotate at a speed that is slower than a speed at which the larger fan motor is designed to rotate when operating at the lowest speed setting.

Example aspects of the present disclosure are directed to a fan controller for ceiling fans. The fan controller can include a power meter circuit. The power meter circuit can be configured to monitor power consumption of a fan motor of the ceiling fan. The fan controller can include a first capacitor and a second capacitor. The capacitance of the second capacitor can be larger than the capacitance of the first capacitor. In some implementations, the capacitance of the first capacitor and the capacitance of the second capacitor can each range from about 4 microfarads to about 10 microfarads. For example, the capacitance of the first capacitor can be about 5 microfarads, and the capacitance of the second capacitor can be about 6 microfarads or about 7 microfarads. It should be appreciated, however, that the first capacitor and the second capacitor can have any suitable capacitance so long as the capacitance of the second capacitor is larger than the capacitance of the first capacitor. As used herein, the use of the term "about" in conjunction with a numerical value is intended to refer to within 10% of the stated numerical value.

The fan controller can include one or more control devices. The one or more control devices can be configured to obtain, via the power meter circuit, data indicative of electrical power the fan motor draws from a power source of the ceiling fan. In some implementations, the data indicative of the electrical power can include data indicative real power and/or apparent power. In some implementations, the data indicative of the electrical power can include one or more parameters associated with the electrical power. For instance, the one or more parameters can, in some implementations, include a power factor associated with the electrical power. Alternatively and/or additionally, the one or more parameters can include a voltage value and/or current value.

The one or more control devices can be further configured to determine a size of the fan motor based, at least in part, on the data indicative of the electrical power. In some implementations, the one or more control devices can compare an amount of electrical power the fan motor draws from the power source to a first range of values and a second range of values that is different than the first range of values. The first range of values can be indicative of a first fan motor having a first size. The second range of values can be indicative of a second fan motor having a second size that is different than the first size. When the one or more control devices determine the amount of electrical power the fan motor draws from the power source falls within the first range of values, the one or more control devices can be configured to determine the fan motor corresponds to the first fan motor (e.g., small fan motor). Conversely, the one or more control devices can be configured to determine the fan motor corresponds to the second fan motor (e.g., large fan motor) when the one or more control devices determine the amount of the electrical power the fan motor draws from the power source falls within the second range of values.

Alternatively and/or additionally, the one or more control devices can be configured to determine the size of the fan motor based, at least in part, on one or more parameters (e.g., power factor, current, voltage, etc.) associated with the electrical power. For instance, in such implementations, the one or more control devices can be configured to compare the one or more parameters to a first range of values and a second range of values. The first range of values can be associated with the first fan motor (e.g., small fan motor) having the first size. The second range of values can be associated with the second fan motor (e.g., large fan motor) having the second size. The one or more control devices can be configured to determine the fan motor corresponds to the first fan motor (e.g., small fan motor) when a value associated with the one or more parameters falls within the first range of values. Conversely, the one or more control devices can be configured to determine the fan motor corresponds to the second fan motor (e.g., large fan motor) when the value associated with the one or more parameters falls within the second range of values.

The one or more control devices be further configured to select the first capacitor or the second capacitor as a selected capacitor based, at least in part, on the determined size of the fan motor. For instance, the one or more control devices can be configured to select the first capacitor as the selected capacitor in response to the one or more control devices determining the fan motor corresponds to the first fan motor (e.g., small fan motor) having the first size. Alternatively, the one or more control devices can be configured to select the second capacitor as the selected capacitor in response to the one or more control devices determining the fan motor corresponds to the second fan motor (e.g., large fan motor) having the second size that is larger than the first size.

In some implementations, the one or more control device can obtain data indicative of a user-request to operate the fan motor at the lowest speed setting of the plurality of speed settings for the fan motor. Furthermore, in response to obtaining the data indicative of the user-request, the one or more control devices can be configured to couple the fan motor to the selected capacitor (e.g., first capacitor or second capacitor).

The fan controller according to example embodiments of the present disclosure provides numerous technical benefits. For instance, the power meter circuit can obtain data (e.g., power consumption data) that the one or more control devices can use to determine a size of a fan motor of a ceiling fan. Furthermore, the fan controller can select the first capacitor or the second capacitor as the selected capacitor based, at least in part, on the determined size of the fan motor. In this manner, the fan motor can operate in a more efficient manner when operating at the lowest speed setting of the plurality of speed settings for the fan motor, because the fan motor is coupled to the power source via the selected capacitor which, as discussed above, is selected based, at least in part, on the determined size of the fan motor.

Referring now to the FIGS., FIGS. 1 through 4 depict a ceiling fan 100 according to example embodiments of the present disclosure. The ceiling fan 100 can be removably mounted to a ceiling 110 separating a first space 112 (e.g., positioned beneath the ceiling 110) from a second space 114 (e.g., positioned above the ceiling 110). In some implementations, the ceiling fan 100 can include a plurality of fan blades 130. As shown, each of the plurality of fan blades 130 can be coupled to a blade hub 132 of the ceiling fan 100. More specifically, each of the fan blades 130 can be coupled to the blade hub 132 via a blade arm 134 such that the fan blades 130 are spaced apart from one another along a circumferential direction C. It should be appreciated that any suitable type of fastener (e.g., screw) can be used to couple the blade arm 134 to the blade hub 132 and a corresponding fan blade.

As shown, the ceiling fan 100 can include a fan motor 140. The fan motor 140 can be configured to receive an input power from a power source (e.g., alternating current (AC)

power source, direct current (DC) power source) for the ceiling fan 100. Furthermore, the fan motor 140 can be operatively coupled to the fan blades 130 via the blade hub 132. In this manner, the fan motor 140 can convert the input power received from the power source into mechanical energy needed to drive rotation of the fan blades 130. In some implementations, the fan motor 140 can be configured to drive rotation of the fan blades 130 in a first direction D1 or a second direction D2 that is different than the first direction D1. For instance, the plurality of fan blades 130 can move air in the first space 112 towards the ceiling 110 when the fan motor 140 drives rotation of the fan blades 130 in the first direction D1. Conversely, the fan blades 130 can move air away (e.g., downward) from the ceiling 110 when the fan motor 140 drives rotation of the fan blades 130 in the second direction D2.

In some implementations, the ceiling fan 100 can include a housing 150 configured to accommodate the fan motor 140. As shown, the fan motor 140 can be positioned within a cavity 152 defined by the housing 150. In some implementations, the ceiling fan 100 can include a cover 154 that can be removably mounted to the housing 150 via one or more fasteners (e.g., screws). In some implementations, the fan motor 140 can be hidden from view when the cover 154 is mounted the housing 150 via the one or more fasteners.

In some implementations, the ceiling fan 100 can include a downrod 160 having a first end 162 and a second end 164 spaced apart from the first end 162 along a length L of the downrod 160. The first end 162 of the downrod 160 can be coupled to a support (e.g., mounting bracket) positioned within the ceiling 110 or the second space 114. The second end 164 of the downrod 160 can be coupled to the housing 150. In this manner, the ceiling fan 100 can be suspended from the ceiling 110.

Figure 4:
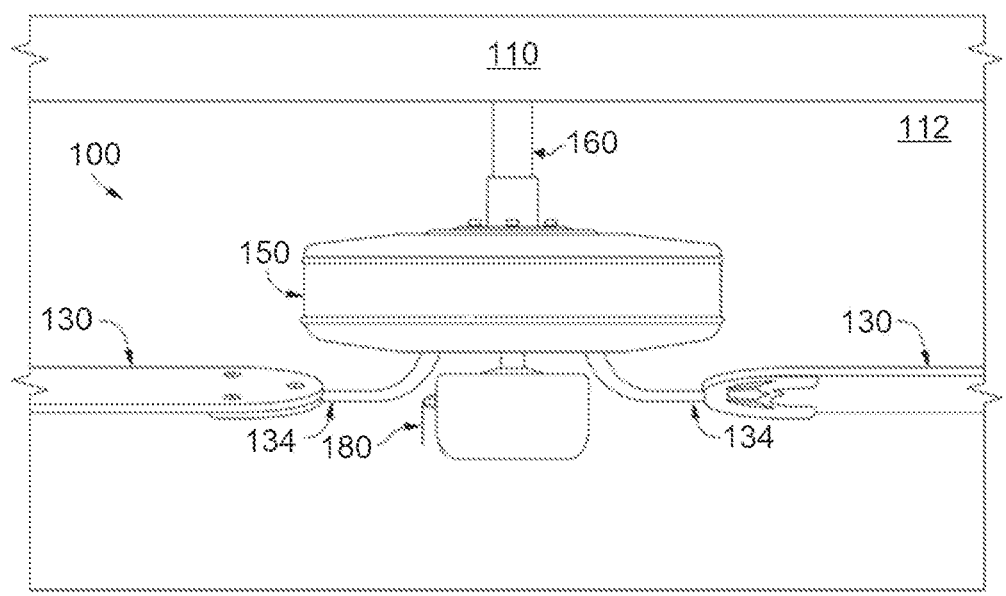
FIG. 4 depicts a ceiling fan having input devices configured to control operation of one or more electrical loads of the ceiling fan according to example embodiments of the present disclosure.

In some implementations, the ceiling fan 100 can include an input device 180 physically located on the ceiling fan 100. For instance, as shown in FIG. 4, the input device 180 can, in some implementations, be a pull-chain switch. As will be discussed below, the input device 180 can be manipulated (e.g., pulled) by a user to control operation of the fan motor 140 of the ceiling fan 100.

The input device 180 can be manipulated (e.g., pulled) by a user to toggle between a plurality of modes for the fan motor 140. For instance, the user can manipulate the input device 180 to switch the fan motor 140 from a first mode in which the fan motor 140 is decoupled from a power source of the ceiling fan 100 to a second mode in which the fan motor 140 is coupled to the power source such that the fan motor 140 rotates the fan blades 130 at a first speed (e.g., low speed). As will be discussed below in more detail, the input device 180 can, in some implementations, be used to toggle between a plurality of speed settings for the fan motor 140.

In some implementations, the user can manipulate the input device 180 again to switch the fan motor 140 from the second mode to a third mode in which the fan motor 140 is coupled to the power source for the ceiling fan 100 such that the fan motor 140 rotates the fan blades 130 at a second speed (e.g., medium) that is faster than the first speed (e.g., low). Furthermore, in some implementations, the user can manipulate the input device 180 yet again to switch the fan motor 140 from the third mode to a fourth mode in which the fan motor 140 is coupled to the power source for the ceiling fan 100 such that the fan motor 140 rotates the fan blades at a third speed (e.g., high) that is faster than the second speed (e.g., medium). In some implementations, the user can manipulate the input device 180 again to switch the fan motor 140 from the fourth mode to the first mode such that the fan motor 140 is no longer coupled to the power source for the ceiling fan 100. However, it should be understood that, in alternative implementations, the fan motor 140 can be configured in more or fewer modes.

Figure 5:
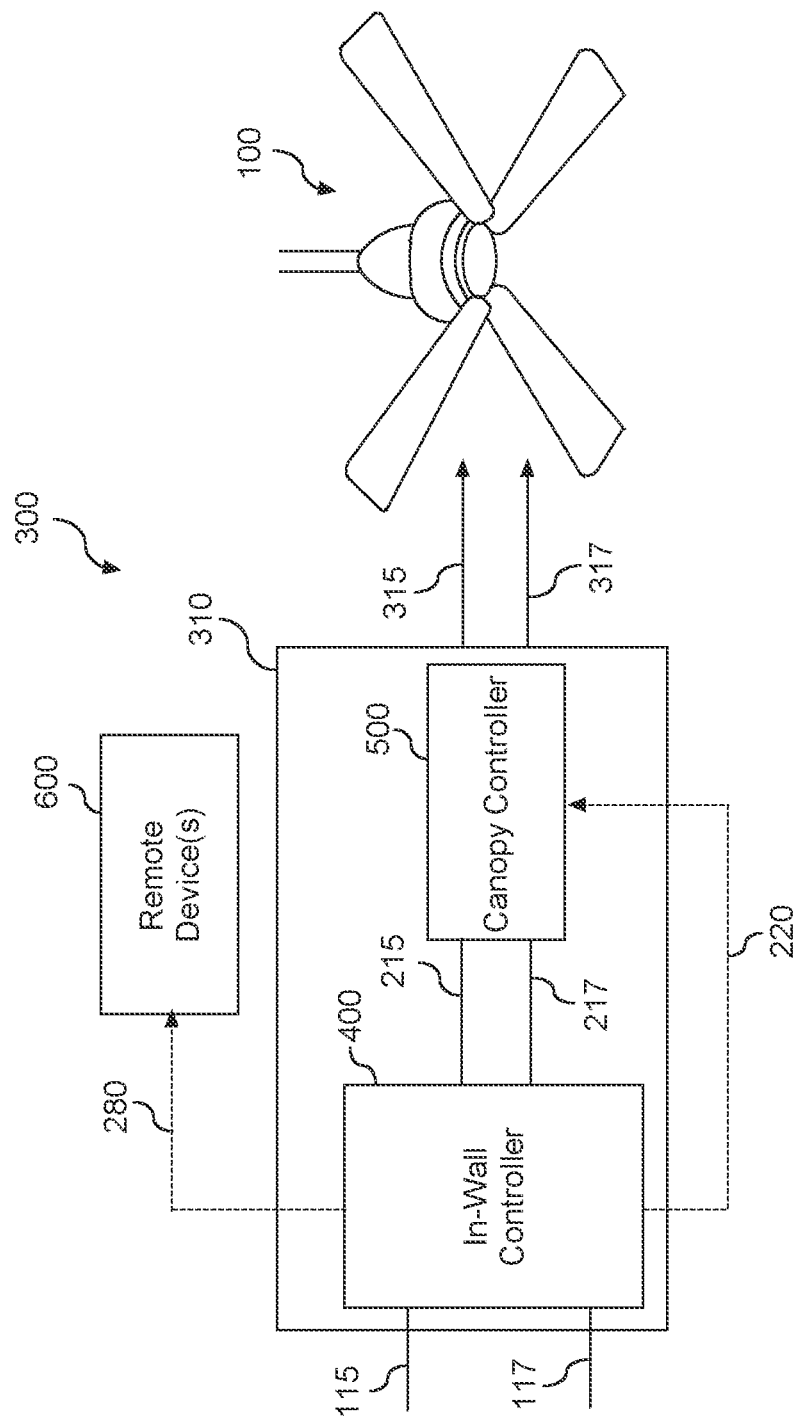
FIG. 5 depicts a fan system according to example embodiments of the present disclosure.

Referring now to FIG. 5, components of a fan system 300 are provided according to example embodiments of the present disclosure. As shown, the fan system 300 can include the ceiling fan 100 and a fan controller 310. In some implementations, the fan controller 310 can include an in-wall controller 400 and a canopy controller 500. The in-wall controller 400 can be positioned in a wall defining the first space 112 (FIG. 1) in which the ceiling fan 100 is located. The canopy controller 500 can be positioned within the housing 150 (FIG. 2) of the ceiling fan 100.

Although the in-wall controller 400 and the canopy controller 500 are described as being in separate locations, it should be appreciated that, in some implementations, the in-wall controller 400 and the canopy controller 500 can be positioned at the same location. For instance, in some implementations, both the in-wall controller 400 and the canopy controller 500 can be positioned in the wall defining the first space 112 (FIG. 1) in which the ceiling fan 100 is located. Alternatively, both the in-wall controller 400 and the canopy controller 500 can be positioned within the housing 150 of the ceiling fan 100.

Figure 2:
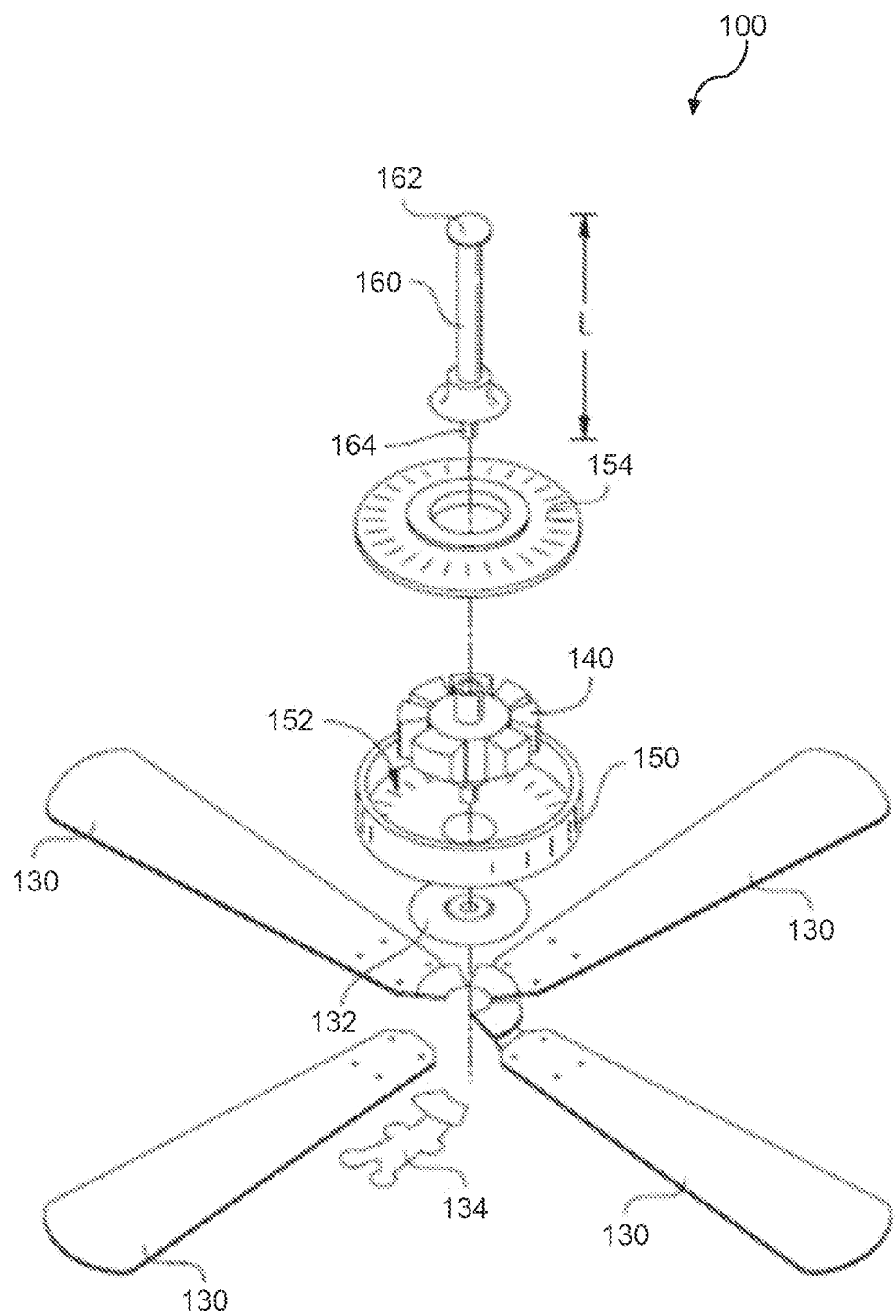
FIG. 2 depicts components of a ceiling fan according to example embodiments of the present disclosure.
Figure 3:
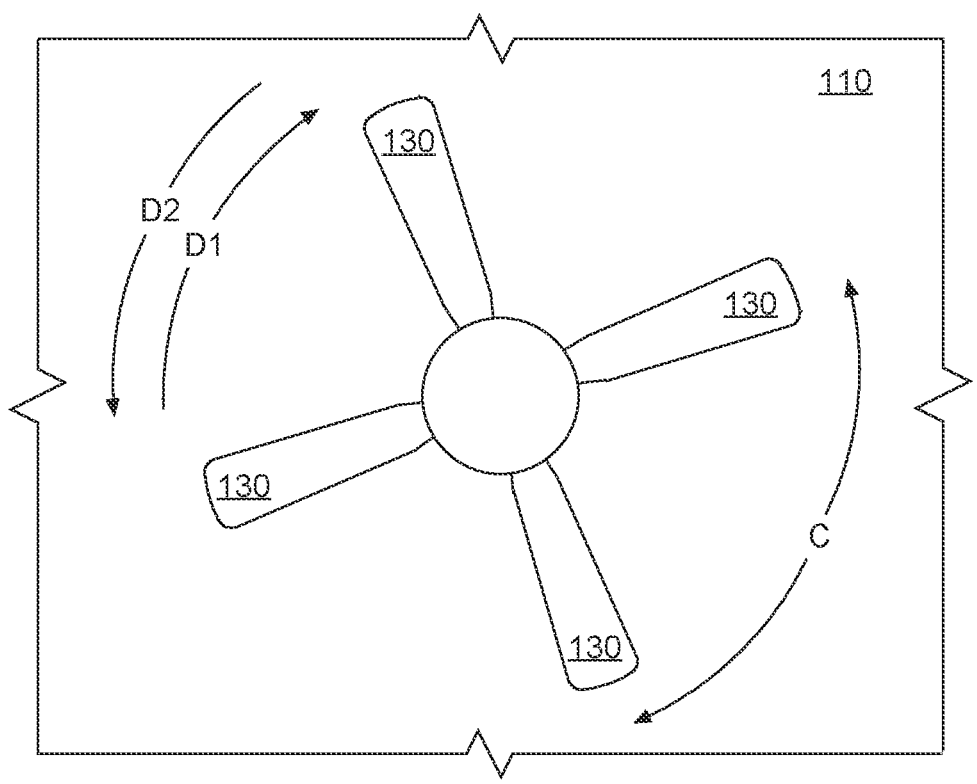
FIG. 3 depicts a bottom view of a ceiling fan according to example embodiments of the present disclosure.

As shown, the in-wall controller 400 can receive power from a power source (e.g., breaker, panel, circuit, etc.) via conductors 115 and 117. Conductor 115 can be a load conductor. Conductor 117 can be a neutral conductor. Furthermore, the in-wall controller 400 can be configured to provide electrical power to the canopy controller 500 via electrical conductors 215 and 217. Electrical conductor 215 can be a load conductor and conductor 217 can be a neutral conductor. The canopy controller 500 can provide fan motor power 315 to the fan motor 140 (FIG. 2).

The in-wall controller 400 can communicate with the canopy controller 500 via a first communication link 220. In this manner, the in-wall controller 400 can send one or more control commands to the canopy controller 500 via the first communication link 220 to control operation of the ceiling fan 100. In some implementations, the first communication link 220 can be a wireless communication link based on any suitable wireless communication protocol. For instance, in some implementations, the wireless communication link can be based on the Bluetooth Low Energy wireless communication protocol.

In some implementations, the in-wall controller 400 can be in communication with one or more remote devices 600, such as one or more computing devices, user devices, servers, cloud computing devices, etc. via a second communication link 280. In some implementations, the second communication link 280 can be a wireless communication link based on any suitable wireless communication protocol. For instance, in some implementations, the wireless communication link can be based on the IEEE 802.11 wireless communication protocol.

Figure 6:
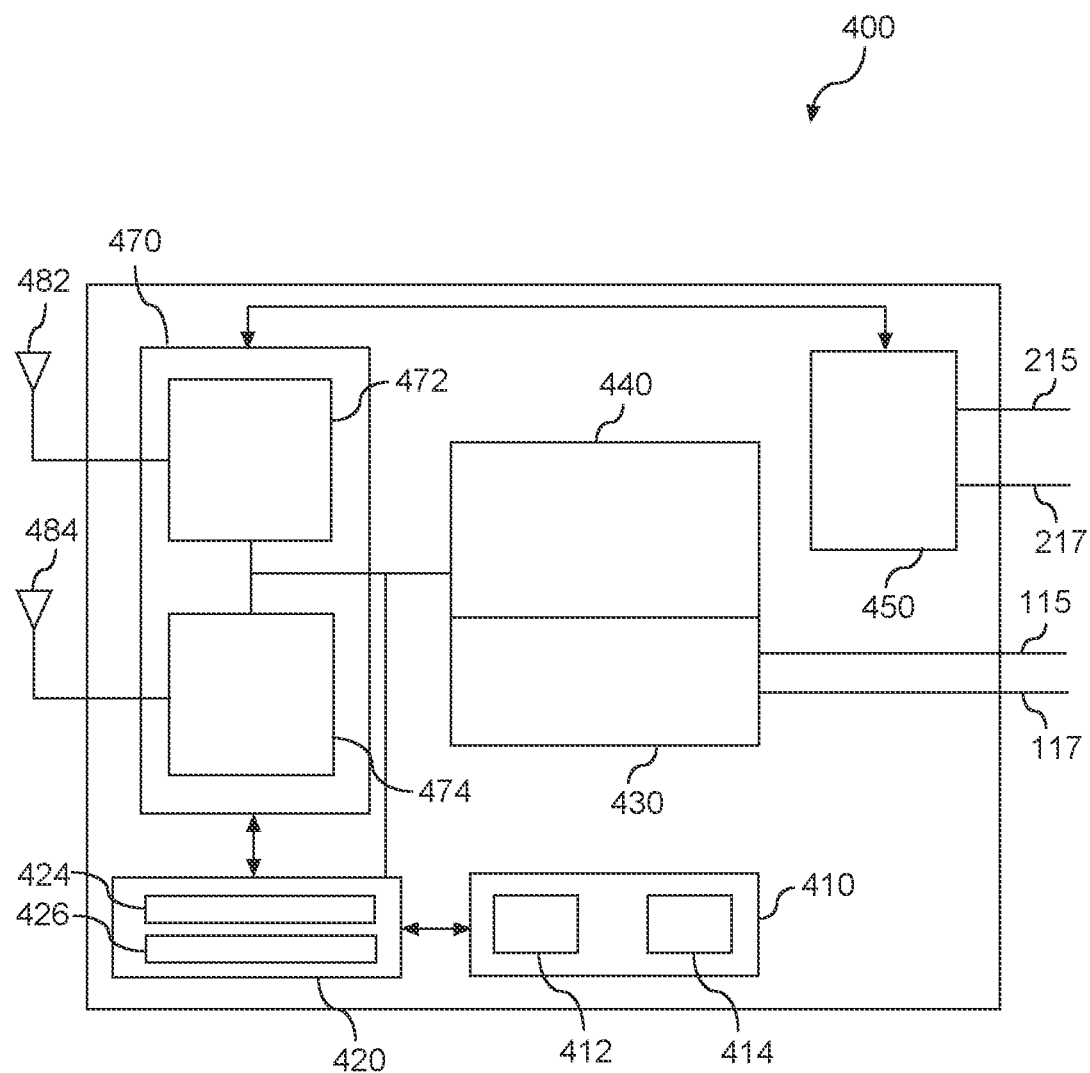
FIG. 6 depicts an example in-wall controller of a fan system according to example embodiments of the present disclosure.

Referring now to FIG. 6, a block diagram of components of the in-wall controller 400 is provided according to example embodiments of the present disclosure. In some implementations, the in-wall controller 400 can include interface circuitry 410 configured to process and/or manage various input and output devices associated with the in-wall controller 400. For instance, the interface circuitry 410 can process inputs from a user provided via buttons or other interface elements 412 (e.g., touchpad, contactless gestures, rocker buttons, toggle switches, dimmer knobs, etc.) on the in-wall controller 400. In this manner, a user can interact with the interface elements 412 to control operation of the fan motor 140 of the ceiling fan 100. For instance, the user can interact with the interface elements 412 to select a speed (e.g., low, medium, high) at which the fan motor 140 rotates the fan blades 130 of the ceiling fan 100.

In some implementations, the interface circuitry 410 can also include one or more drivers or other circuits used to control the illumination of indicators (e.g., LED indicators) on the in-wall controller 400. For instance, the interface circuitry 410 can include an LED driver used to power LEDs 414 to provide visual indicators to a user.

In some implementations, the in-wall controller 400 can include one or more control devices 420 that can be used to implement various functionality of the in-wall controller 400, such as any of the functionality described herein. For instance, the one or more control devices 420 can control the communication of data and/or control commands from the in-wall controller 400. The one or more control devices 420 can control the processing of inputs received via interface circuitry 410. The one or more control devices 420 can control the delivery of outputs (e.g., indicators) via the interface circuitry 410. In some implementations, the interface circuitry 410 can form a part or be included as the one or more control devices 420.

The one or more control devices 420 can include one or more processors 424 and one or more memory devices 426. The one or more processors 424 can be any suitable processing device, such as microprocessors, integrated circuits (e.g., application specific integrated circuits), field programmable gate arrays, etc. that perform operations to control components (e.g., any of the components described herein). The one or memory devices 426 can be any suitable media for storing computer-readable instructions and data. For instance, the one or more memory devices 426 can include random access memory such as dynamic random access memory (DRAM), static memory (SRAM) or other volatile memory. In addition, and/or in the alternative, the one or more memory devices can include non-volatile memory, such as ROM, PROM, EEPROM, flash memory, optical storage, magnetic storage, etc.

The one or more memory devices 426 can store computer-readable instructions that, when executed by the one or more processors 424, cause the one or more processors 424 to perform operations, such as any of the operations described herein. The instructions can be software written in any suitable programming language or can be implemented in hardware. The one or more memory devices 426 can also store data that can be obtained, received, accessed, written, manipulated, created, and/or stored.

In some implementations, the in-wall controller 400 can include a communication interface 470. The communication interface 470 can allow for the communication of data via, for instance, one or more wireless links using one or more antennas (e.g., antenna 482 and antenna 484). In some implementations, the communication interface 470 can include, for example, one or more of a communications controller, receiver, transceiver, transmitter, port, conductors, software, and/or hardware for communicating data.

As shown, the communication interface 470 can include a first circuit 472 for communicating data via antenna 482. In some implementations, the first circuit 472 can be configured to communicate data and other information, for instance, to another fan controller using Bluetooth Low Energy communication technology. The communication interface 470 can include a second circuit 474 for communicating data and other information (e.g., control commands) via antenna 484. For instance, the second circuit 374 can be configured to communicate data and other information, for instance, to a router, gateway, or other device using IEEE 802.11 communication technology.

In some implementations, the in-wall controller 400 can include a power meter circuit 430 configured to determine one or more parameters associated with electrical power flowing through the in-wall controller 400. The power meter circuit 430 can measure voltage and/or current flowing through conductor 115. Current can be measured, for instance, using a sense resistor. Voltage can be measured using, for instance, a voltage divider. Power flowing through the conductor 115 can be computed (e.g., using one or more processors 424 located on the in-wall controller 400 and/or remote from the in-wall controller 400) based on the measured current and voltage. In some implementations, the power meter circuit 430 can be a STPM32 metering circuitry manufactured by STMicroelectronics.

In some implementations, the in-wall controller 400 can include an AC to DC converter 440. The AC to DC converter 440 can convert AC power from conductor 115 and conductor 117 to DC power suitable for powering various components of the in-wall controller 400, such as communication interface 470, control devices 420, interface circuitry 410, etc.

In some implementations, the in-wall controller 400 can include one or more switching devices 450 (e.g., relay, power transistor, contactor, thyristor, etc.) for controlling the delivery of AC power from the in-wall controller 400 to one or more electrical loads of the ceiling fan 100 via electrical conductors 215 and 217. In some implementations, the one or more switching devices 450 can serve as an airgap switch to disconnect power from the one or more electrical loads of the ceiling fan 100.

Figure 7:
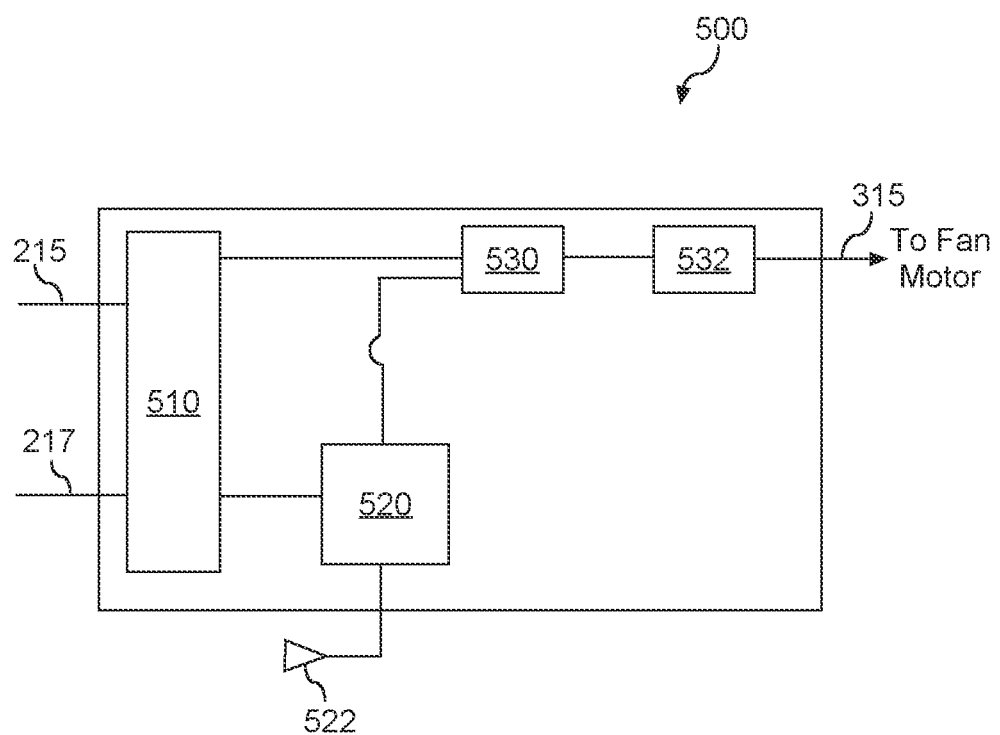
FIG. 7 depicts an example canopy controller of a fan system according to example embodiments of the present disclosure.
Figure 8:
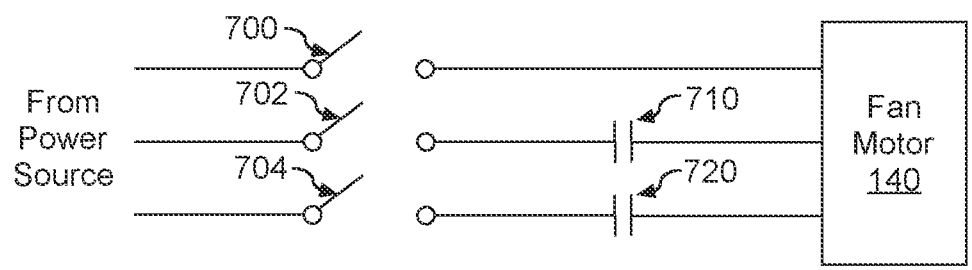
FIG. 8 depicts fan controller circuitry associated with speed control of a fan motor of a ceiling fan according to example embodiments of the present disclosure.

Referring now to FIG. 7, a block diagram of components of the canopy controller 500 is provided according to example embodiments of the present disclosure. The canopy controller 500 can receive AC power from the in-wall controller 400 (FIG. 5) via electrical conductors 215 and 217. In some implementations, the canopy controller 500 can include an AC to DC converter 510. The AC to DC converter 510 can be configured to convert the AC power provided via electrical conductors 215 and 217 to DC power suitable for powering various components of the canopy controller 500, such as a communication interface 520, and a fan motor controller 530.

The communication interface 520 can allow for the communication of data via, for instance, one or more wireless links using one or more antennas (e.g., antenna 522). For instance, the communication interface 520 can include one or more components to facilitate communication with the in-wall controller 400 (FIG. 5) via the first communication link 220 (FIG. 5). In this manner, the communication interface 520 can be configured to receive one or more control commands from the in-wall controller 400.

The fan motor controller 530 can be configured to control operation of the fan motor 140 (FIG. 2). For instance, the fan motor controller 530 can be configured to process one or more control commands received from the in-wall controller 400 (FIG. 5) and associated with controlling operation of the fan motor 140 (FIG. 2). In some implementations, the one or more control commands can be associated with controlling a direction (e.g., first direction D1 or second direction D2) in which the fan motor 140 rotates the fan blades 130 (FIG. 1) of the ceiling fan 100. Alternatively or additionally, the one or more control commands can be associated with controlling a speed (e.g., low, medium, high) at which the fan motor 140 rotates the fan blades 130.

In some implementations, the canopy controller 500 can include a power meter circuit 532 configured to measure one or more parameters (e.g., current, voltage, power factor, etc.) associated with the fan motor power 315 (e.g., electrical power) the fan motor 140 draws from a power source for the ceiling fan 100 (FIG. 1). Current can be measured, for instance, using a sensor resistor. Voltage can be measured using, for instance, a voltage divider. The fan motor power 315 can be computed (e.g., using one or more processors of the canopy controller 500 and/or remote from the canopy controller 500) based on the measured current and/or voltage. As will be discussed below in more detail, the fan controller 310 can include capacitors that can be selectively coupled to the fan motor 140 to adjust a speed at which the fan motor 140 rotates.

Referring now to FIGS. 8-12, the fan controller 310 can include switching devices 700, 702, 704 configurable in a first or open configuration (FIG. 8) and a second or closed configuration to selectively couple the fan motor 140 to the power source (e.g., AC mains) for the ceiling fan 100 (FIG. 1). Furthermore, the fan controller 310 can include a first capacitor 710 and a second capacitor 720 that can each be selectively coupled to the fan motor 140 via switching devices 730, 732. As will be discussed below, operation of the switching devices 700, 702, 704 can be controlled to configure the fan motor 140 to operate at a desired speed setting of a plurality of speed settings (e.g., low, medium, high) for the fan motor 140.

It should be understood that a capacitance of the second capacitor 720 is different than a capacitance of the first capacitor 710. More specifically, the capacitance of the second capacitor 720 is greater than the capacitance of the first capacitor 710. In some implementations, the capacitance of the first capacitor 710 and the capacitance of the second capacitor 720 can each range from about 4 microfarads to about 8 microfarads. For example, the capacitance of the first capacitor 710 can be about 5 microfarads and the capacitance of the second capacitor 720 can be about 6 microfarads. As another example, the capacitance of the first capacitor 710 can be about 5 microfarads and the capacitance of the second capacitor 720 can be about 7 microfarads.

Figure 9:
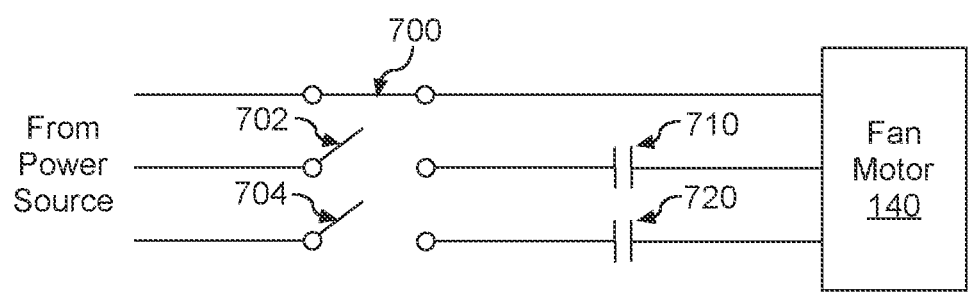
FIG. 9 depicts configuration of the circuitry of FIG. 8 to operate the fan motor at a highest speed setting for the fan motor according to example embodiments of the present disclosure.

The fan motor controller 530 (FIG. 7) can be configured to control operation of switching devices 700, 702, 704 based, at least in part, on one or more control commands associated with operating the fan motor 140 at one of the plurality of speed settings (e.g., low, medium, high) for the fan motor 140. For example, as shown in FIG. 9, operation of the switching devices 700, 702, 704 can be controlled to operate the fan motor 140 at a highest speed setting (FIG. 9) of the plurality of speed settings for the fan motor 140. In particular, operation of switching device 700 can be controlled such that switching device 700 is in the closed configuration. In this manner, the fan motor 140 can be coupled to the power source via switching device 700. Furthermore, operation of switching devices 702, 704 can be controlled such that switching devices 702, 704 are each in the open configuration. In this manner, the first capacitor 710 and the second capacitor 720 can each be decoupled from the power source when the fan motor 140 is operating at the highest speed setting of the plurality of speed settings for the fan motor 140. As will be discussed below, at least one of the first capacitor 710 and the second capacitor 720 can be coupled to the power source via switching devices 702 and 704, respectively, when the fan motor 140 is operating at speed settings other than the highest speed setting.

Figure 10:
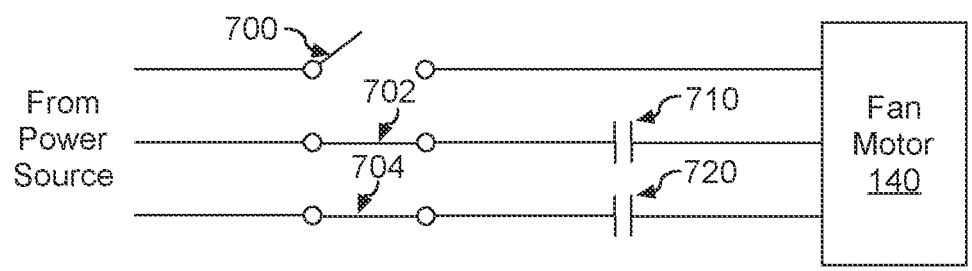
FIG. 10 depicts configuration of the circuitry of FIG. 8 to operate the fan motor at an intermediate speed setting for the fan motor according to example embodiments of the present disclosure.

As shown in FIG. 10, operation of the switching devices 700, 702, 704 can be controlled to operate the fan motor 140 at an intermediate speed setting (e.g., medium) of the plurality of speed settings for the fan motor 140. For instance, operation of switching device 700 can be controlled such that switching device 700 is in the open configuration. Furthermore, operation of switching devices 702, 704 can be controlled such that switching devices 702, 704 are each in the closed configuration. In this manner, the fan motor 140 can be coupled to the power source via the first capacitor 710 and the second capacitor 720 when the fan motor 140 is operating at the intermediate speed setting of the plurality of speed settings for the fan motor 140. As will be discussed below in more detail, only one of the capacitors (e.g., first capacitor 710 and second capacitor 720) can be coupled to the power source when the fan motor 140 is operating at a lowest speed setting of the plurality of speed settings for the fan motor 140.

Figure 11:
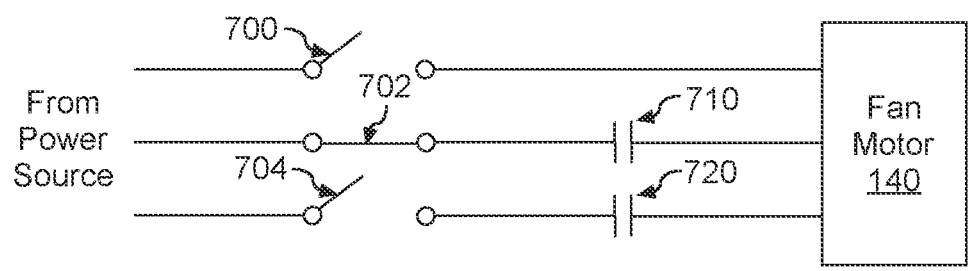
FIG. 11 depicts configuration of the circuitry of FIG. 8 to operate the fan motor at a lowest speed setting for the fan motor according to example embodiments of the present disclosure.
Figure 12:
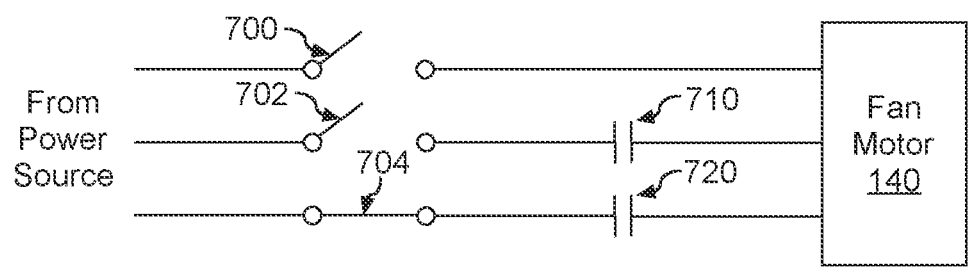
FIG. 12 depicts another configuration of the circuitry of FIG. 8 to operate the fan motor at the lowest speed setting for the fan motor according to example embodiments of the present disclosure.

As shown in FIGS. 11 and 12, operation of the switching devices 700, 702, 704 can be controlled to operate the fan motor 140 at the lowest setting of the plurality of speed settings for the fan motor 140. For instance, in some implementations, operation of switching devices 700, 704 can be controlled such that switching devices 700, 704 are in the open configuration. Furthermore, operation of switching device 702 can be controlled such that switching device 702 is in the closed configuration. In this manner, the fan motor 140 can, in some implementations, be coupled to the power source via the first capacitor 710 when the fan motor 140 is operating at the lowest speed setting of the plurality of speed settings for the fan motor 140.

In alternative implementations, operation of switching device devices 700, 702 can be controlled such that switching devices 700, 702 are in the open configuration. Furthermore, operation of switching device 704 can be controlled such that switching device 704 is in the closed configuration. In this manner, the fan motor 140 can, in some implementations, be coupled to the power source via the second capacitor 720 when the fan motor 140 is operating at the lowest speed setting of the plurality of speed settings for the fan motor 140. As will be discussed below, the fan controller 310 according to the present disclosure can be configured determine a size of the fan motor 140 and select the first capacitor 710 or the second capacitor 720 as a selected capacitor based, at least in part, on the determined size of the fan motor 140. In this manner, operation of the fan motor 140 when operating at the lowest speed setting can be improved, because the fan motor 140 is coupled to the power source via the selected capacitor (e.g., first capacitor 710 or second capacitor 720) that is selected based, at least in part, on the determined size of the fan motor 140.

In some implementations, the fan controller 310 can be configured to obtain, via the power meter circuit 430, 532, data indicative of electrical power the fan motor draws from a power source of the ceiling fan 100. For instance, in some implementations, the data indicative of the electrical power can include data indicative real power and/or apparent power. Alternatively and/or additionally, the data indicative of the electrical power can include one or more parameters associated with the electrical power. For instance, the one or more parameters can, in some implementations, include a power factor associated with the electrical power. The fan controller 310 can be further configured to determine a size of the fan motor 140 based, at least in part, on the data indicative of the electrical power.

In some implementations, the fan controller 310 can compare an amount of electrical power the fan motor 140 draws from the power source to a first range of values and a second range of values that is different than the first range of values. The first range of values can be indicative of a first fan motor having a first size. The second range of values can be indicative of a second fan motor having a second size that is larger than the first size. When the fan controller 310 determine the amount of electrical power the fan motor 140 draws from the power source falls within the first range of values, the fan controller 310 can determine the fan motor 140 corresponds to the first fan motor (e.g., small fan motor). Conversely, the fan controller 310 can determine the fan motor 140 corresponds to the second fan motor (e.g., large fan motor) when the fan controller 310 determines the amount of the electrical power the fan motor 140 draws from the power source falls within the second range of values.

The fan controller 310 can be further configured to select the first capacitor 710 or the second capacitor 720 as a selected capacitor based, at least in part, on the determined size of the fan motor 140. For instance, the fan controller 310 can be configured to select the first capacitor as the selected capacitor in response to the fan controller 310 determining the fan motor 140 corresponds to the first fan motor (e.g., small fan motor) having the first size. Alternatively, the fan controller 310 can be configured to select the second capacitor as the selected capacitor in response to the fan controller 310 determining the fan motor 140 corresponds to the second fan motor (e.g., large fan motor) having the second size that is larger than the first size In some implementations, the fan controller 310 can obtain data indicative of a user-request to operate the fan motor at the lowest speed setting of the plurality of speed settings for the fan motor 140. For example, in some implementations, the user-input can be provided via the interface elements 412 of the in-wall controller 400. As another example, the user-input can be provided via the input device 180 physically located on the ceiling fan 100. As yet another example, the user-input can be provided via a user interacting with a graphical user-interface displayed on one of the remote devices 600 communicatively coupled to the fan controller 310.

Furthermore, in response to obtaining the data indicative of the user-request, the fan controller 310 can be configured to couple the fan motor 140 to the power source via the selected capacitor. In this manner, operation of the fan motor 140 when operating at the lowest speed setting of the plurality of speed settings for the fan motor 140 can be improved, because the selected capacitor (e.g., first capacitor 710 or second capacitor 720) is selected based, at least in part, on the determined size of the fan motor 140.

Figure 13:
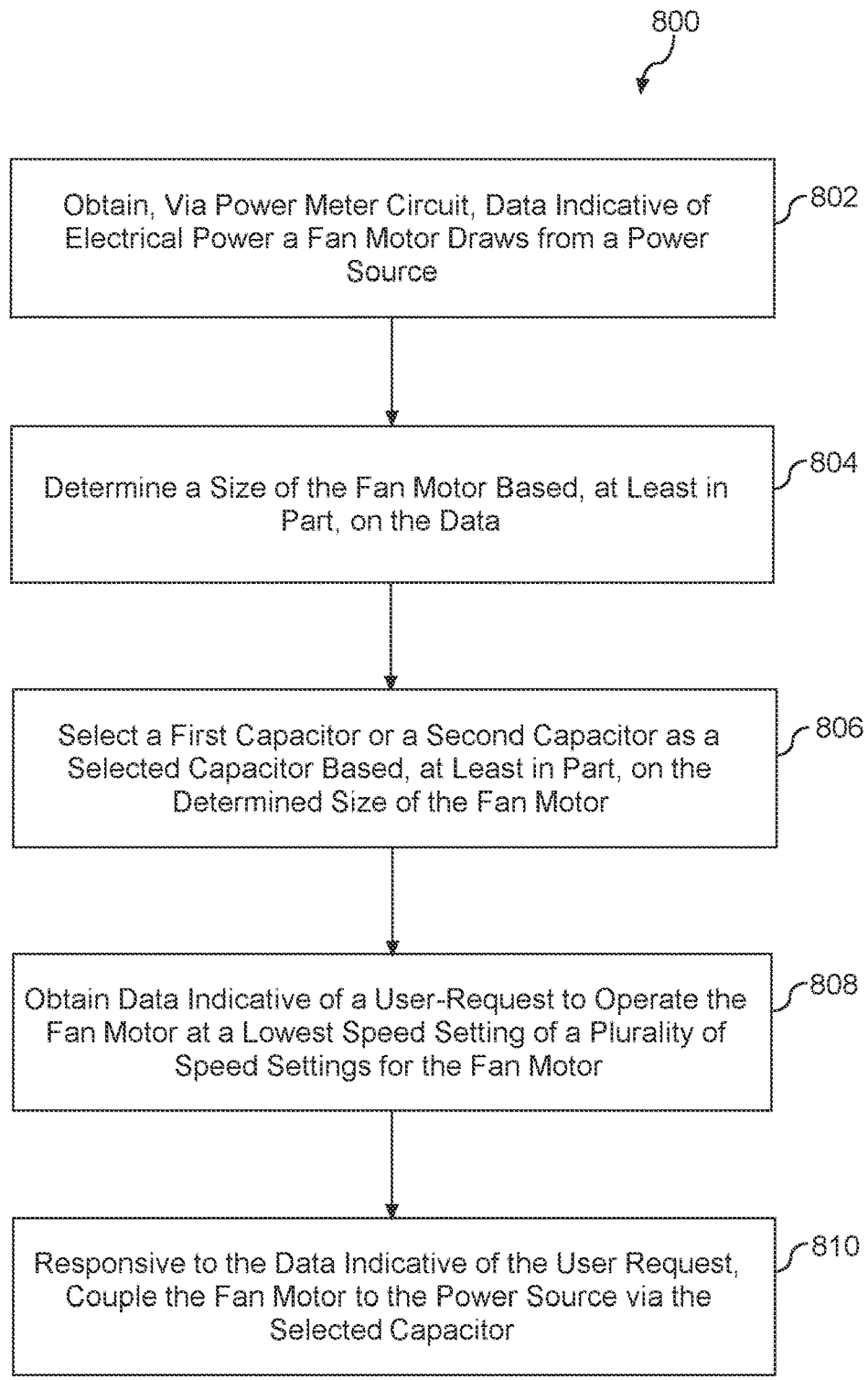
FIG. 13 depicts a flow diagram of a method for selecting a capacitor of a fan controller to couple a fan motor to a power source when the fan motor is operating at a lowest speed setting of a plurality of speed settings according to example embodiments of the present disclosure.

Referring now to FIG. 13, a flow diagram of a method 800 for selecting which capacitor (e.g., first capacitor and second capacitor) of a fan controller to use to couple a fan motor to a power source when the fan motor is operating at a lowest speed setting of a plurality of speed settings according to example embodiments of the present disclosure is provided. The method 800 can be implemented, for instance, using the fan system 300 discussed above with reference to FIGS. 5-7. FIG. 13 depicts steps performed in a particular order for purposes of illustration and discussion. Those of ordinary skill in the art, using the disclosures provided herein, will understand that various steps of any of the methods described herein, will understand that various steps of any of the methods described herein can be adapted, expanded, omitted, rearranged, performed simultaneously, and/or modified in various ways without deviating from the scope of the present disclosure.

At (802), the method 800 can include obtaining, by one or more control devices of the fan controller, data indicative of electrical power a fan motor of a ceiling fan draws from a power source. In some implementations, the data can be indicative of real power and/or apparent power. Alternatively or additionally, the data can be indicative of one or more parameters associated with the electrical power. For example, in some implementations, the one or more parameters can include a power factor associated with the electrical power.

In some implementations, the fan motor can be operating at a speed setting that is different than the lowest speed setting for the fan motor when the one or more control devices obtain the data indicative of the electrical power the fan motor draws from the power source. For instance, in some implementations, the fan motor can be operating at a highest speed setting of the plurality of speed settings for the fan motor. Alternatively, the fan motor can be operating at an intermediate speed setting of the plurality of speed settings for the fan motor.

At (804), the method 800 can include determining, by the one or more control devices, a size of the fan motor based, at least in part, on the data obtained at (802). For instance, in some implementations, the one or more control devices can compare an amount of electrical power the fan motor draws from the power source to a first range of values and a second range of values that is different than the first value or range of values to determine the size of the fan motor. The first range of values can be indicative of a first fan motor having a first size. The second range of values can be indicative of a second fan motor having a second size that is different (e.g., larger) than the first size. When the one or more control devices determine the amount of electrical power the fan motor draws from the power source falls within the first range of values, the one or more control devices can determine the fan motor corresponds to the first fan motor (e.g., small fan motor) having the first size. Conversely, the one or more control devices can determine the fan motor corresponds to the second fan motor (e.g., large fan motor) when the one or more control devices determine the amount of the electrical power the fan motor draws from the power source falls within the second range of values.

Alternatively and/or additionally, the one or more control devices can be configured to determine the size of the fan motor based, at least in part, on one or more parameters (e.g., power factor, current, voltage, etc.) associated with the electrical power. For instance, in such implementations, the one or more control devices can be configured to compare the one or more parameters to a first range of values and a second range of values. The first range of values can be associated with the first fan motor (e.g., small fan motor) having the first size. The second range of values can be associated with the second fan motor (e.g., large fan motor) having the second size. The one or more control devices can be configured to determine the fan motor corresponds to the first fan motor (e.g., small fan motor) when a value associated with the one or more parameters falls within the first range of values. Conversely, the one or more control devices can be configured to determine the fan motor corresponds to the second fan motor (e.g., large fan motor) when the value associated with the one or more parameters falls within the second range of values.

At (806), the method 800 can include selecting the first capacitor or the second capacitor as a selected capacitor based, at least in part, on the determined size of the fan motor. For instance, the one or more control devices can be configured to select the first capacitor as the selected capacitor when it is determined the fan motor corresponds to the first fan motor (e.g., small fan motor) having the first size. Alternatively, the one or more control devices can be configured to select the second capacitor as the selected capacitor when it is determined the fan motor corresponds to the second fan motor (e.g., larger fan motor) having the second size that is larger than the first size.

At (808), the method 800 can include obtaining, by the one or more control devices, data indicative of a user-request to operate the fan motor at a lowest speed setting of a plurality of speed settings for the fan motor. The method 800 can proceed to (810) in response to obtaining the data indicative of the user-request to operate the fan motor at the lowest speed setting of the plurality of speed settings.

At (810), the method 800 can include coupling, by the one or more control devices, the fan motor to the power source via the selected capacitor (e.g., first capacitor or second capacitor) as determined at (804). For instance, the one or more control devices can be configured to couple the fan motor to the power source via the first capacitor when the selected capacitor corresponds to the first capacitor. Alternatively, the one or more control devices can be configured to couple the fan motor to the power source via the second capacitor when the selected capacitor corresponds to the second capacitor.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A fan controller for a ceiling fan, the fan controller comprising:
   one or more switching devices configured to selectively couple the ceiling fan to a power source;
   a first capacitor having a first capacitance;
   a second capacitor having a second capacitance, the second capacitance being larger than the first capacitance;
   a power meter circuit; and
   one or more control devices configured to:
      obtain, via the power meter circuit, data indicative of electrical power a fan motor of the ceiling fan draws from the power source;
      determine a size of the fan motor based, at least in part, on the data;
      select the first capacitor or the second capacitor as a selected capacitor based at least in part on the determined size of the fan motor;
      obtain data indicative of a user-request to operate the fan motor at a lowest speed setting of a plurality of speed settings for the fan motor; and
      in response to the data indicative of the user-request, couple the fan motor to the power source via the selected capacitor.

2. The fan controller of claim 1, wherein the one or more control devices are further configured to compare an amount of electrical power the fan motor draws from the power source to a first range of values and a second range of values that is different than the first range of values to determine the size of the fan motor.

3. The fan controller of claim 2, wherein,
   when the amount of electrical power falls within the first range of values, the one or more control devices are configured to determine the fan motor corresponds to a first fan motor having a first size; and
   when the amount of electrical power falls within the second range of values, the one or more control devices are configured to determine the fan motor corresponds to a second fan motor having a second size that is greater than the first size.

4. The fan controller of claim 1, wherein when the one or more control devices obtain the data indicative of the electrical power the fan motor draws from the power source, the fan motor is operating at a speed setting that is different than the lowest speed setting.

5. The fan controller of claim 4, wherein the speed setting corresponds to a highest speed setting of the plurality of speed settings for the fan motor.

6. The fan controller of claim 4, wherein the speed setting corresponds to an intermediate speed setting of the plurality of speed settings for the fan motor.

7. The fan controller of claim 1, wherein the data indicative of the electrical power comprises data indicative of one or more parameters associated with the electrical power.

8. The fan controller of claim 7, wherein,
   when a value associated with the one or more parameters falls within a first range of values, the one or more control devices are configured to determine the fan motor corresponds to a first motor having a first size; and
   when the value associated with the one or more parameters falls within a second range of values that is different than the first range of values, the one or more control devices are configured to determine the size of the fan motor corresponds to a second motor having a second size that is larger than the first size.

9. The fan controller of claim 8, wherein the one or more parameters comprise a power factor associated with the electrical power.

10. The fan controller of claim 1, wherein the data indicative of the electrical power comprises data indicative of at least one of real power and apparent power.

11. The fan controller of claim 1, wherein the capacitance of the first capacitor and the capacitance of the second capacitor each range from about 4 microfarads to about 10 microfarads.

12. The fan controller of any claim 11, wherein,
   the capacitance of the first capacitor is about 5 microfarads; and
   the capacitance of the second capacitor is about 6 microfarads.

13. The fan controller of claim 11, wherein,
   the capacitance of the first capacitor is about 5 microfarads; and
   the capacitance of the second capacitor is about 7 microfarads.

14. A fan system, comprising:
   a ceiling fan comprising a fan motor, the fan motor configurable to operate at a plurality of speed settings;
   a fan controller configured to control power delivery to the ceiling fan, the fan controller comprising:

one or more switching devices configured to selectively couple the ceiling fan to a power source;
a first capacitor;
a second capacitor having a capacitance that is greater than a capacitance of the first capacitor;
a power meter circuit; and
one or more control devices configured to:
   obtain, via the power meter circuit, data indicative of electrical power a fan motor of the ceiling fan draws from the power source;
   determine a size of the fan motor based, at least in part, on the data;
   select the first capacitor or the second capacitor as a selected capacitor based at least in part on the determined size of the fan motor;
   obtain data indicative of a user-request to operate the fan motor at a lowest speed setting of a plurality of speed settings for the fan motor; and
   in response to the data indicative of the user-request, couple the fan motor to the power source via the selected capacitor.

15. The fan system of claim 14, wherein the one or more control devices are further configured to compare an amount of electrical power the fan motor draws from the power source to a first range of values and a second range of values that is different than the first range of values to determine the size of the fan motor.

16. The fan system of claim 15, wherein,
   when the amount of electrical power falls within the first range of values, the one or more control devices are configured to determine the fan motor corresponds to a first fan motor having a first size; and
   when the amount of electrical power falls within the second range of values, the one or more control devices are configured to determine the fan motor corresponds to a second fan motor having a second size that is greater than the first size.

17. The fan system of claim 14, wherein the data indicative of the electrical power comprises data indicative of one or more parameters associated with the electrical power.

18. The fan system of claim 17, wherein,
   when a value associated with the one or more parameters falls within a first range of values, the one or more control devices are configured to determine the fan motor corresponds to a first motor having a first size; and
   when the value associated with the one or more parameters falls within a second range of values that is different than the first range of values, the one or more control devices are configured to determine the size of the fan motor corresponds to a second motor having a second size that is larger than the first size.

19. The fan system of claim 18, wherein the one or more parameters comprise a power factor associated with the electrical power.

20. The fan system of claim 14, wherein the data indicative of the electrical power comprises data indicative of at least one of real power and apparent power.

* * * * *